United States Patent [19]
Inoue

[11] Patent Number: 5,987,167
[45] Date of Patent: Nov. 16, 1999

[54] COLOR IMAGE DISPLAY METHOD AND APPARATUS

[75] Inventor: Akira Inoue, Tokyo, Japan

[73] Assignee: NEC Corporation, Japan

[21] Appl. No.: 08/814,990

[22] Filed: Mar. 14, 1997

[30] Foreign Application Priority Data

Mar. 29, 1996 [JP] Japan ................................ 6-103848

[51] Int. Cl.⁶ .................. G06K 9/00; G03F 3/08
[52] U.S. Cl. ............... 382/167; 382/162; 358/518; 358/523
[58] Field of Search .................. 382/167, 162; 358/518, 523, 527, 461

[56] References Cited

U.S. PATENT DOCUMENTS

| | | | |
|---|---|---|---|
| 5,196,924 | 3/1993 | Lumelsky et al. | 358/461 |
| 5,258,829 | 11/1993 | Matsunaga et al. | 358/527 |
| 5,502,580 | 3/1996 | Yoda et al. | 358/518 |
| 5,604,610 | 2/1997 | Spaulding et al. | 358/525 |

FOREIGN PATENT DOCUMENTS

| | | | |
|---|---|---|---|
| 4-291591 | 10/1992 | Japan | H04N 9/64 |
| 5244404 | 9/1993 | Japan | H04N 1/40 |
| 7177367 | 7/1995 | Japan | H04N 1/60 |
| 7295536 | 11/1995 | Japan | G09G 5/02 |
| 1994139 | 12/1998 | Japan | G09G 5/02 |

OTHER PUBLICATIONS

Japanese Office Action dated Nov. 17, 1998 and partial translation.

*Primary Examiner*—Bijan Tadayon
*Assistant Examiner*—Dmitry A. Novik
*Attorney, Agent, or Firm*—Ostrolenk, Faber, Gerb & Soffen, LLP

[57] ABSTRACT

A color image display apparatus includes an input color characteristic obtaining unit for obtaining input color characteristic data simultaneously with input of image data, an input color characteristic data storage unit for storing the obtained input characteristic data, an image display device such as a CRT or the like, a display color characteristic data storage unit for storing the color characteristic of the image display device, a color transformation table generating means for generating a color transformation table, and a color transforming means for actually color-transforming the image data. The color transformation table generating means further includes a color transformation system selecting means, and a plural-tables generating unit.

6 Claims, 7 Drawing Sheets

61: REFERENCE POINT

60: THREE-DIMENSIONAL TABLE DATA

| Index R | G | B | R' | G' | B' |
|---|---|---|---|---|---|
| 0 | 0 | 0 | 0 | 0 | 1 |
| 0 | 0 | 1 | 0 | 5 | 40 |
| ⋮ | | | ⋮ | | |
| 1 | 0 | 0 | 33 | 0 | 1 |
| 1 | 0 | 1 | 40 | 1 | 45 |
| 1 | 0 | 2 | 45 | 2 | 99 |
| ⋮ | | | ⋮ | | |
| 3 | 3 | 0 | 200 | 190 | 10 |
| 3 | 3 | 1 | 200 | 195 | 55 |
| 3 | 3 | 2 | 202 | 200 | 103 |
| ⋮ | | | ⋮ | | |
| 5 | 5 | 5 | 255 | 245 | 254 |

FIG. 6A
51: TRANSFORMATION CHARACTERISTIC OF ONE-DIMENSIONAL TABLE
FIG. 6B
50: ONE-DIMENSIONAL TABLE DATA
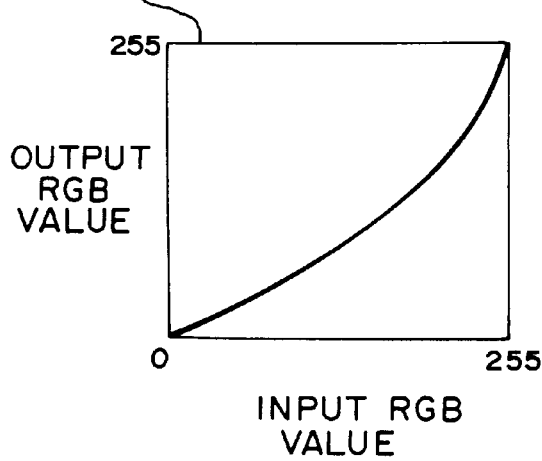
| INPUT | OUTPUT |
|-------|--------|
| 0     | 0      |
| 1     | 0      |
| 2     | 1      |
| ...   | ...    |
| 128   | 100    |
| ...   | ...    |
| 255   | 255    |
FIG. 7
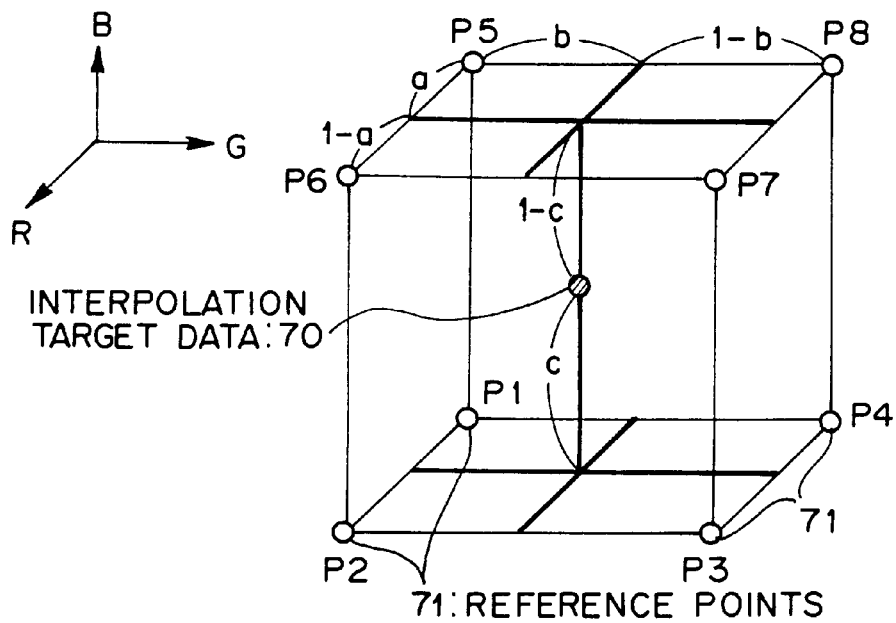
71: REFERENCE POINTS

COLOR IMAGE DISPLAY METHOD AND APPARATUS

BACKGROUND OF THE INVENTION

1. Field of the Invention

The present invention relates to a color image display method and apparatus, and particularly to a technique for performing a color display which does not rely on a display device.

2. Description of Related Art

As described in Japanese Laid-open Patent Application NO. Hei-4-291591, according to this type color image display apparatus, RGB image data are subjected to inverse gamma correction, matrix calculation and then gamma correction to display an image.

A conventional color image display apparatus will be described with reference to FIG. 8. The conventional color image display comprises an inverse gamma correction circuit 101, a color transformation matrix calculator 102, a gamma correction circuit 103 and a display device 104 such as a CRT (Cathode Ray Tube).

An input RGB signal is subjected to inverse gamma correction in the inverse gamma correction circuit 101 so that the gamma characteristic of a specific TV camera is in inverse form. This correction operation serves to return the TV camera signal to a linear RGB signal.

The linear RGB signal thus obtained is subjected to the matrix calculation in the color transformation matrix calculator 102 whose coefficient is variable. The color transformation matrix is a matrix for correcting the difference between RGB fluorescent materials (fluorescent substances) at input and output sides and the difference between white colors at the input and output sides. The RGB signal thus matrix-calculated is subjected to the gamma correction which is matched with the display device 104 such as a CRT in the gamma correction circuit 103, thereby displaying an image.

However, this type of conventional color image display apparatus as described above is not provided with any means for obtaining the coefficient of the color transformation matrix calculator 102 and the characteristics of the inverse gamma correction circuit 101 and the gamma correction circuit 103 from the external side. Therefore, it is necessary to beforehand assume the color characteristic of an image to be displayed and input it into the display apparatus.

Japanese Laid-open Patent Application No. Hei-4-291591 discloses a color display apparatus which can solely perform color reproduction having no color reproduction error on image signals having plural different color reproduction characteristics in accordance with each of various systems. In this color display apparatus, it is proposed that the matrix coefficient is controlled to be variable in the color transformation matrix calculator 102, however, there is not any means for obtaining the matrix coefficient itself.

Therefore, in the color display apparatus as described above, the color correction can be accurately performed by only a specific display device, and no accurate color correction can be performed by using other display devices.

Further, according to this type of conventional color image display apparatus, the three correction processing steps of the inverse gamma correction, the matrix correction and the gamma correction are carried out at all times. In this case, actually, there may be a case where it is sufficient to perform only the gamma correction. However, an extra processing time is needed because the inverse gamma calculation and the matrix correction which are not required are also carried out.

In addition, in this type of conventional color image display apparatus, the color correction based on the matrix calculation is performed, and thus accurate color correction which is based on more complicated non-linear transformation processing cannot be performed.

SUMMARY OF THE INVENTION

An object of the present invention is to provide a color image display method and apparatus which can perform a color display which is not dependent on any display device.

In order to attain the above objective, according to a first aspect of the present invention, a color image display method comprises the steps of (a) obtaining the color characteristic of input image data before an input color image is displayed, (b) selecting a color transformation method on the basis of the color characteristic of a display screen and the color characteristic of the input image data, (c) generating a transformation table in accordance with the selected color transformation method, and (d) performing color transformation on the input image data by the selected color transformation method.

According to a second aspect of the present invention, a color image display method comprises the steps of selecting an optimum transformation method from plural color transformation methods on the basis of information on the color characteristic of input image data and the color characteristic of a display device, and performing color transformation on the input image data on the basis of a transformation table which is generated in accordance with the selected color transformation method to perform a color display in accordance with the display device.

According to a third aspect of the present invention, a color image display apparatus comprises input color characteristic information obtaining means for obtaining color characteristic information of an input color image, input color characteristic data storing means for holding the input color characteristic data obtained by the input color characteristic information obtaining means, display color characteristic data storing means for storing color characteristic data of a display device, color transformation table generating means for generating color transformation table data on the basis of the input color characteristic data and the display color characteristic data, and color transforming means for correcting the color of the input image data, wherein the color transforming means has plural table transforming means, and the color transformation table generating means includes color transformation system selecting means for selecting a color transformation system from plural color transformation systems on the basis of the input color characteristic data and the display color characteristic data, and plural-tables generating means for generating plural color transformation tables.

BRIEF DESCRIPTION OF THE DRAWINGS

FIGS. 6A and 6B are diagrams showing one-dimensional table data;

FIG. 7 is a diagram showing an interpolating method in three-dimensional LUT transformation processing.

DETAILED DESCRIPTION OF THE PREFERRED EMBODIMENTS

Preferred embodiments according to the present invention will be described hereunder with reference to the accompanying drawings.

First, the principle of the color image display method and apparatus according to the present invention will be described.

Figure 4:
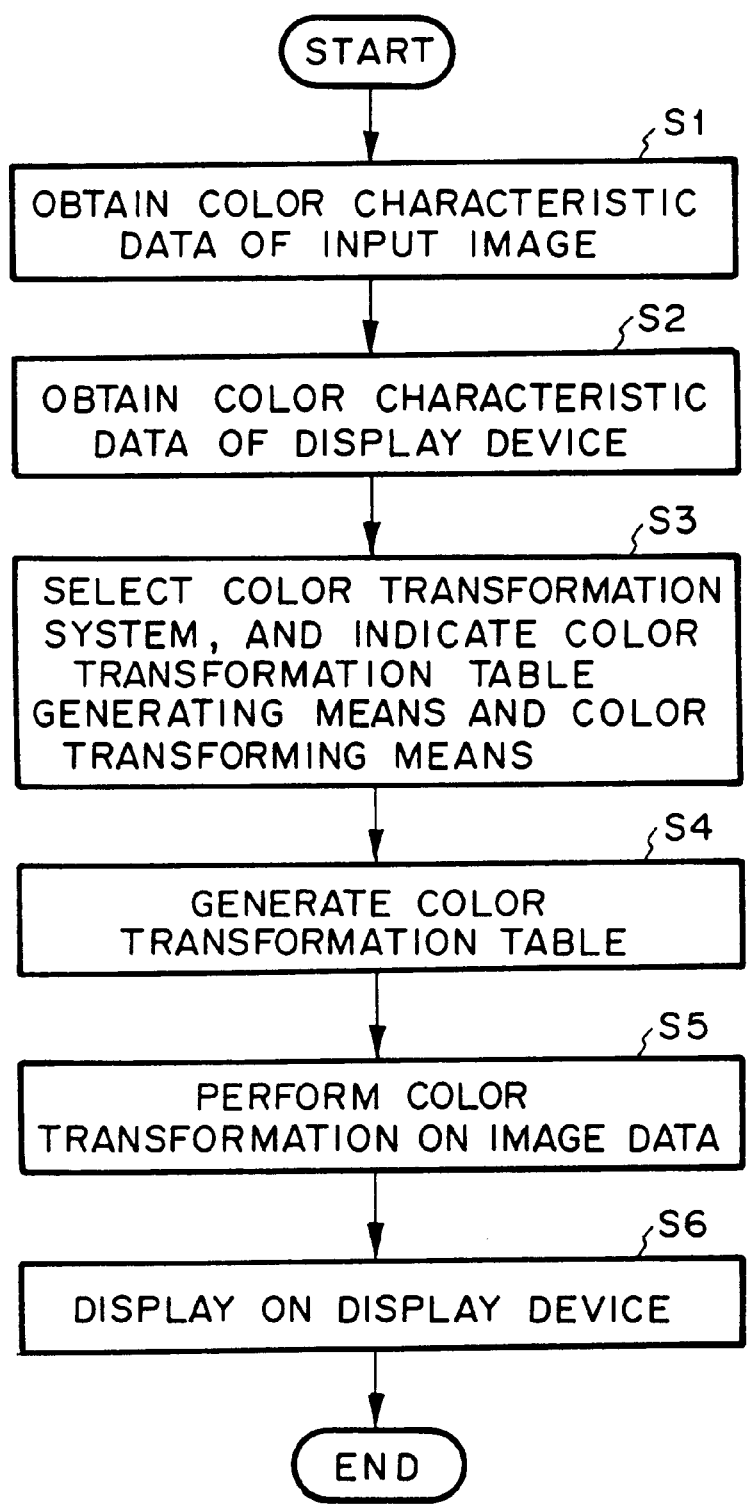
FIG. 4 is a flowchart showing a color image display method according to a second aspect of the present invention.

A process flow of the color image display method of the present invention will be described with reference to a flowchart of FIG. 4. Simultaneously with the input of image data, color characteristic data of an input image are automatically obtained from the external side (step S1), and then color characteristic data of a display device are obtained from an internal storage unit (step S2).

Subsequently, a color transformation system is selected on the basis of both the color characteristic data of the input image and the display device (step S3). In this case, (a) simple LUT (Look-Up Table) transformation for performing transformation processing with a one-dimensional table, (b) three-dimensional LUT transformation for performing transformation processing with a three-dimensional table and then interpolating data, and (c) mixed matrix transformation for performing gamma correction and matrix calculation, are used as color transformation systems. In a color transformation system selecting step (step S3), the optimum color transformation system is selected from the above color transformation systems in consideration of the color transformation precision and the processing speed from the characteristics of the input and output sides.

Subsequently, a color transformation table corresponding to the selected color transformation system is generated (step S4), and the input image data are subjected to the selected color transformation (step S5), and an image is displayed on the display device (step S6).

A First Embodiment

Figure 1:
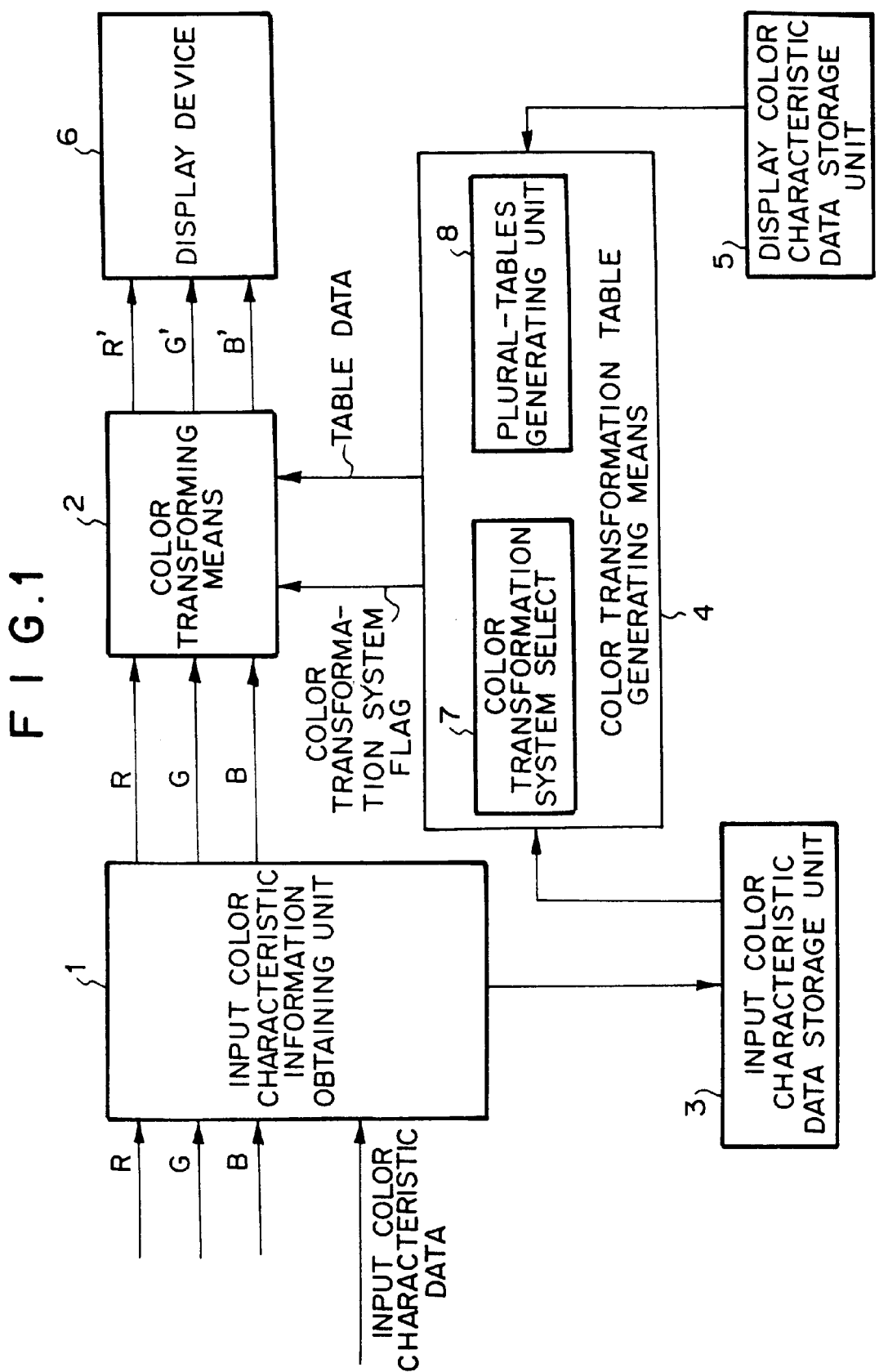
FIG. 1 is a block diagram showing a color image display apparatus according to a first aspect of the present invention.

FIG. 1 is a block diagram showing a first embodiment of a color image display apparatus according to the present invention. As shown in FIG. 1, the first embodiment of the present invention includes input color characteristic information obtaining unit 1 for obtaining input color characteristic data at the same time when image data R, G and B and input color characteristic data are input, an input color characteristic data storage unit 3 for storing the input color characteristic data thus obtained, an image display device 6 such as a CRT, a display color characteristic data storage unit 5 for storing the color characteristic of the image display device 6, a color transformation table generating means 4 for generating a color transformation table on the basis of the input color characteristic data and the display color characteristic data, and color transforming means 2 for actually performing color transformation on the image data.

The color transformation table generating means 4 further comprises a color transformation system selecting means 7 for selecting the color transformation method corresponding to the image display device 6, and a plural-tables generating unit 8 for generating the transformation table corresponding to the selected color transformation method.

In the first aspect of the present invention, upon detection of input of an image signal, the input color characteristic information obtaining unit 1 automatically obtains input color characteristic data which includes color information of an input image, and stores it in the input color characteristic data storage unit 3. After the input color information data are obtained, a color transformation table is generated by the color transformation table generating means 4 on the basis of the input color information data and the data of the display device stored in the display color characteristic data storing unit 5.

The first aspect of the present invention will be described in more detailed with the following embodiments.

The input color characteristic data contain various items such as a color coordinate system (device color space), a color coordinate system of an RGB fluorescent substance (fluorescent material), a chromaticity of white color, and transformation table information to an intermediate color coordinate system of input signals. Table 1 shows an example of the items of the input color characteristic data.

TABLE 1

|  | COLOR CHARACTERISTIC DATA |
|---|---|
| FLUORESCER CHROMATICITY:R | (x,y) = (0.64, 0.30) |
| FLUORESCER CHROMATICITY:G | (x,y) = (0.29, 0.60) |
| FLUORESCER CHROMATICITY:B | (x,y) = (0.15, 0.050) |
| CHROMATICITY OF REFERENCE WHITE COLOR | (x,y) = (0.281, 0.311) |
| GAMMA CHARACTERISTIC TABLE | . . . |
| INTERMEDIATE COLOR SPACE | XYZ |
| TRANSFORMATION TABLE TO INTERMEDIATE COLOR SPACE FROM DEVICE | . . . |

In the table 1, the fluorescer chromaticity represents x,y chromaticity of the R,G,B fluorescers. The chromaticity of the reference white color represents x,y chromaticity of the reference white color of a monitor (display screen). The gamma characteristic table is a one-dimensional table in which the gamma characteristic of the monitor (display screen) is described. When the input image data comprises 8 bits, a table corresponding to a value from 0 to 255 is described. The gamma characteristic table is designed to have the same one-dimensional table format as a look-up table 50 shown in FIG. 6B.

Further, the intermediate color space is used when the color characteristic of the input image is different from the color characteristic of the display device. That is, the input image data are temporarily transformed to data in an intermediate color coordinate system, and then the data are used to be transformed to data in the color coordinate system of the display device. The CIE-XYZ coordinate system or the CIE-L*a*b* coordinate system is used as the intermediate color space.

In the table 1, the transformation table from the device to the intermediate color space is designed in the same format as the three-dimensional table 60 shown in FIG. 5, and the device color space represents the color space of the input image. The device color space is normally RGB space, and the characteristic thereof is dependent on the input image data. The intermediate color space which is the output is the CIE-XYZ or CIE-L*a*b* coordinate system.

The display color characteristic data contain a color coordinate system (device color space), a chromaticity coordinate of RGB fluorescers, a chromaticity coordinate of white color, and transformation table information from the intermediate color coordinate system to the device color space for display signals. Table 2 shows an example of the items of the display color characteristic data.

TABLE 2

|  | COLOR CHARACTERISTIC DATA |
| --- | --- |
| FLUORESCER CHROMATICITY:R | (x, y) = (0.64, 0.30) |
| FLUORESCER CHROMATICITY:G | (x, y) = (0.29, 0.60) |
| FLUORESCER CHROMATICITY:B | (x, y) = (0.15, 0.050) |
| CHROMATICITY OF REFERENCE WHITE COLOR | (x, y) = 0.281, 0.311) |
| GAMMA CHARACTERISTIC TABLE | ... |
| INTERMEDIATE COLOR SPACE | XYZ |
| TRANSFORMATION TABLE TO INTERMEDIATE COLOR SPACE FROM DEVICE | ... |

Figures 5A, 5B:
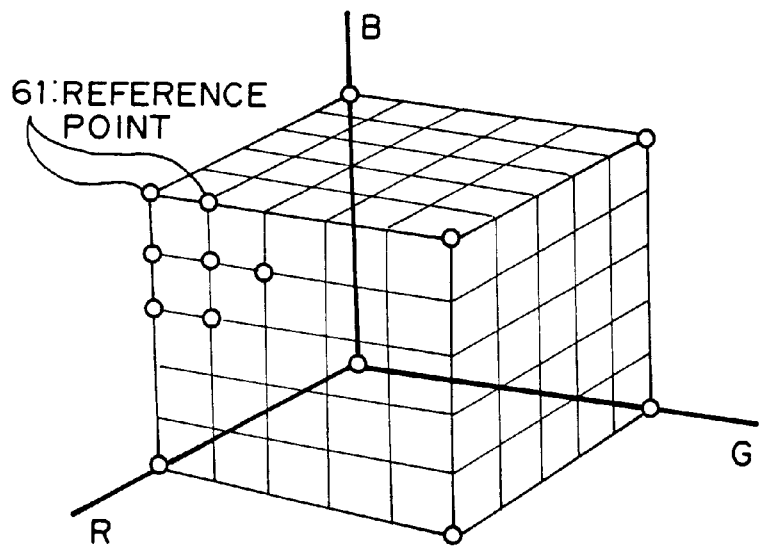
FIGS. 5A and 5B are diagrams showing three-dimensional table data.
Figure 8:
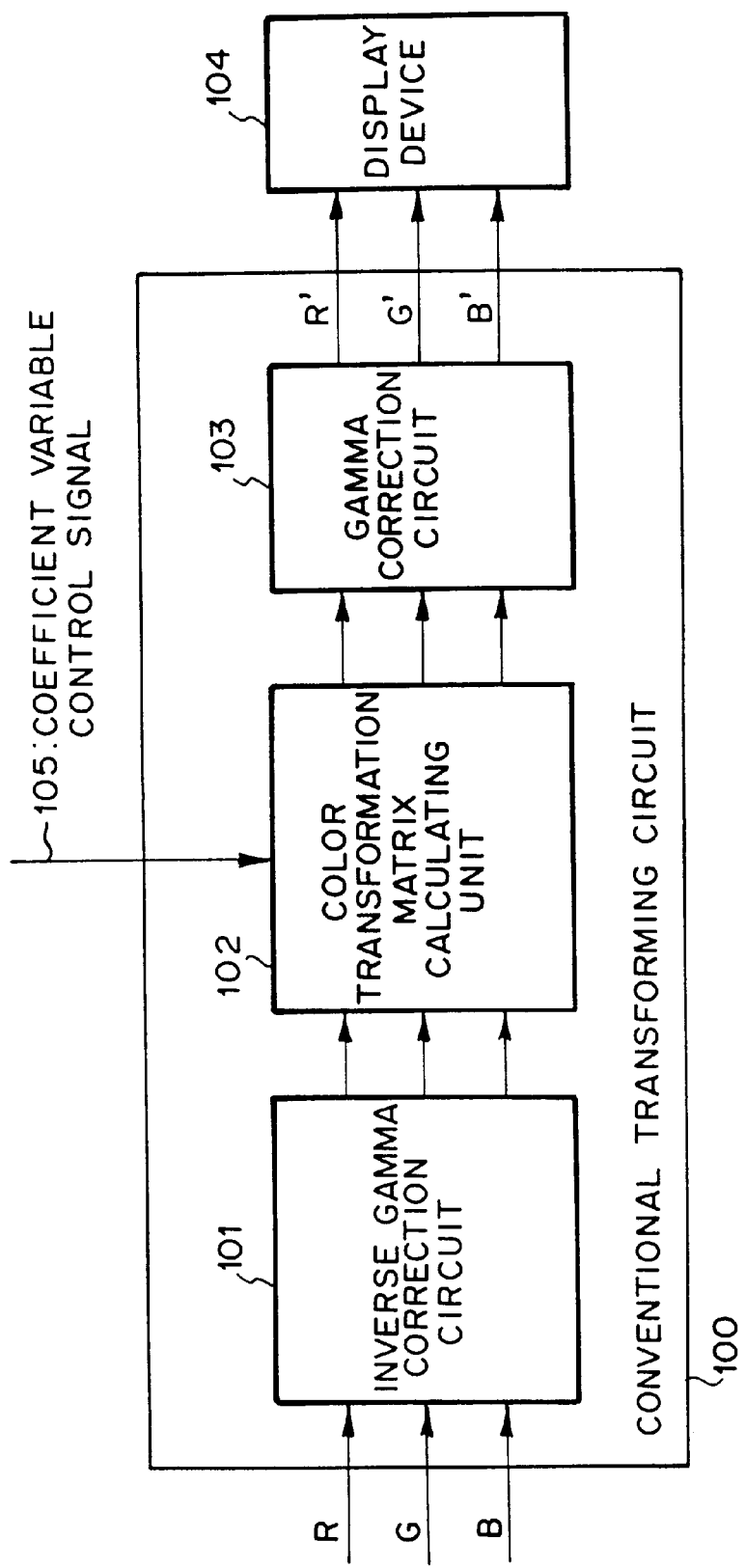
FIG. 8 is a block diagram showing a conventional color display apparatus.

The transformation table from the device to the intermediate color space have the same format as the three-dimensional table 60 shown in FIG. 5B, and the input is the CIE-XYZ or CIE-L*a*b* coordinate system which is the intermediate color space, and the output is the color space (RGB) of the display device. The other items are the same items as the input color characteristic data.

Returning to FIG. 1, a color transformation system is selected on the basis of the input and display color characteristic data by the color transformation system selecting means 7 in the color transformation table generating means 4.

Further, the transformation table corresponding to each transformation system is generated by the plural-tables generating unit 8. The color transformation method which is selected by the color transformation table generating means 4 is set as a color transformation system flag while the generated transformation table is set as table data, and these flag and data are transmitted to the color transforming means 2.

In the color transforming means 2, the color transformation is performed on the input image data by using the indicated color transformation method and the table data, and the color-transformed data are output to the display device 6. A CRT or LCD (liquid crystal display) may be used as the display device 6.

A Second Embodiment

Next, a second embodiment of the color display device according to the present invention will be described.

Figure 2:
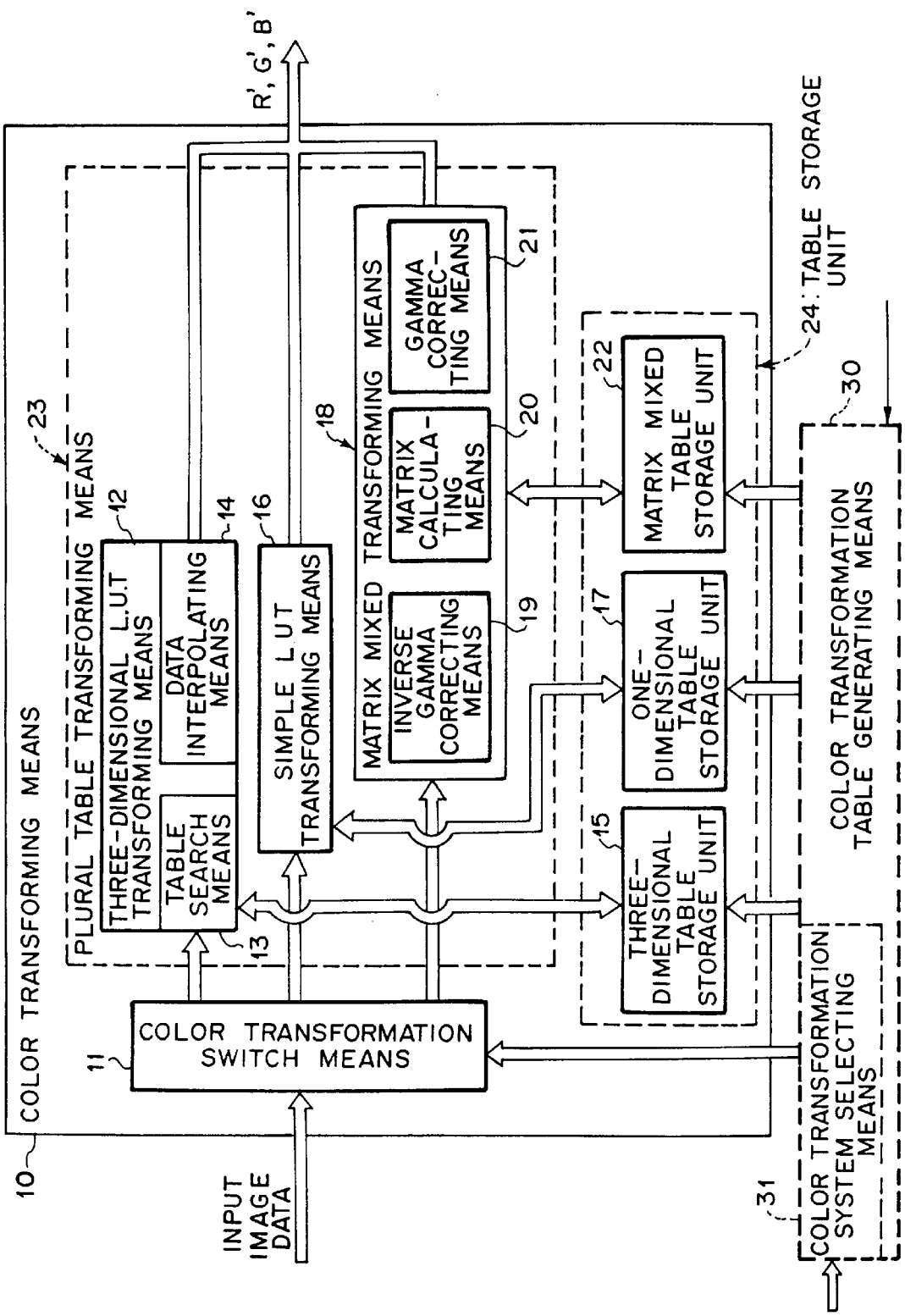
FIG. 2 is a block diagram showing an embodiment of color transforming means of the color image display apparatus according to the present invention.
Figure 3:
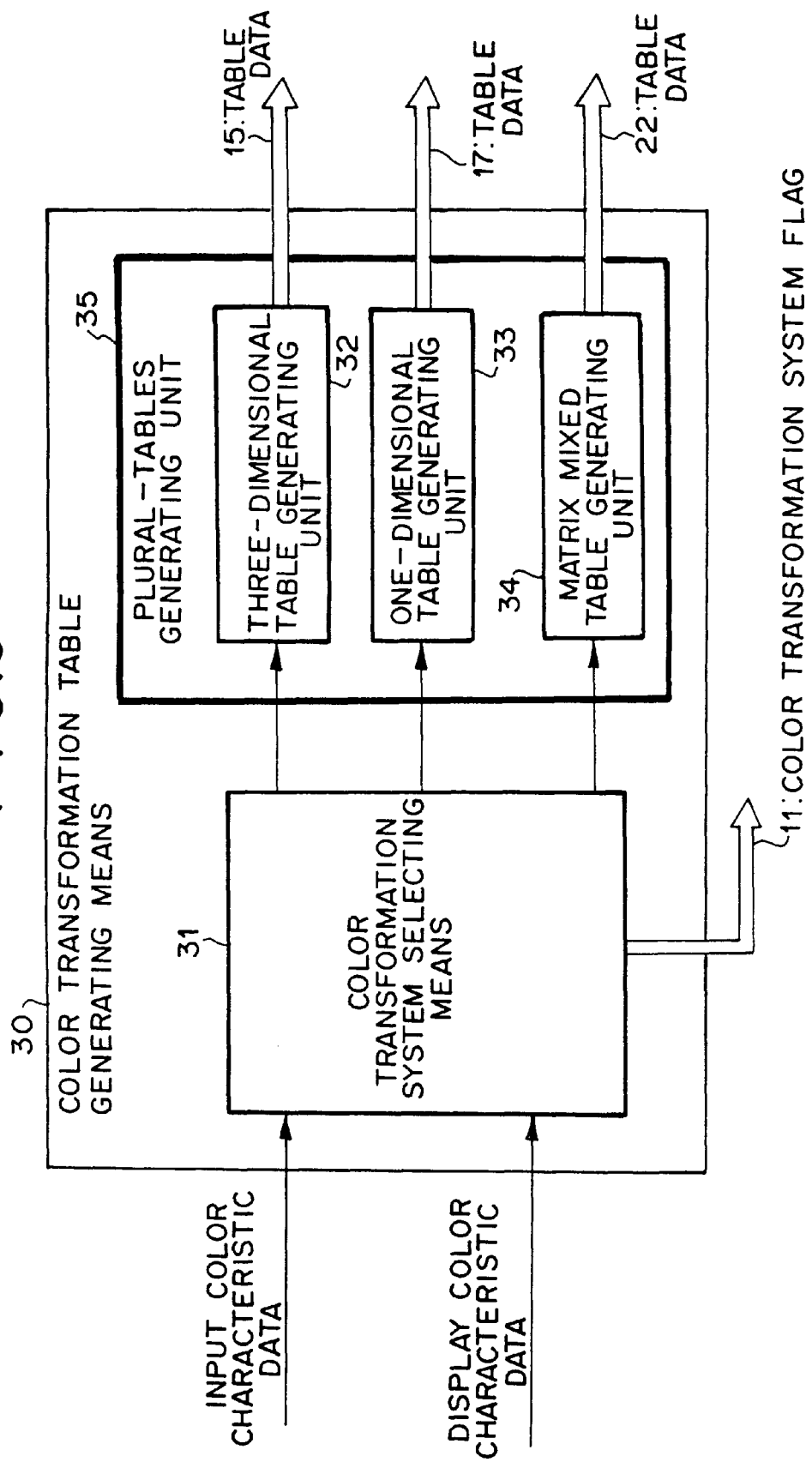
FIG. 3 is a block diagram showing an embodiment of color transformation table generating means of the color image display apparatus according to the present invention.

The second embodiment of the color display device according to the present invention is provided with color transformation table generating means 30 in place of the color transformation table generating means 4 shown in FIG. 1, and also with color transforming means 10 in place of the color transforming means 2 (see FIGS. 2 and 3).

Upon detection of input of an image signal, the input color characteristic data are first obtained by the input color characteristic information obtaining unit 1, and stored in the input color characteristic data storage unit 3 (see FIG. 1). After the input color information data are obtained, a color transformation table is generated by the color transformation table generating means 30 on the basis of the input color information data and the data of the display color characteristic data storage unit 5.

Referring to FIG. 3, in the color transformation table generating means 30, the color transformation system is selected from the three-dimensional LUT transformation, the simple LUT transformation an the matrix mixed transformation on the basis of the input and display color characteristic data by the color transformation system selecting means 31, and the transformation table corresponding to each transformation system is generated by the plural-tables generating unit 35. The plural-tables generating unit 35 comprises a three-dimensional table generating unit 32, a one-dimensional table generating unit 33 and a matrix mixed table generating unit 34.

The corresponding transformation table is generated by the three-dimensional table generating unit 32 when the selected color transformation is the three-dimensional LUT transformation, by the one-dimensional table generating unit 33 when it is the simple LUT transformation, and by the matrix mixed table generating unit 34 when it is the matrix mixed transformation.

The selected color transformation system is fed as a color transformation system flag to the color transforming means 10, and the transformation table thus generated is fed as table data to the color transforming means 10.

Referring to FIG. 2, the color transforming means 10 comprises a color transformation switch means 11, a table storage unit 24 as indicated by a broken line of FIG. 2, and plural table transforming means 23 as indicated by a broken line of FIG. 2.

The table storage unit 24 comprises a three-dimensional table storage unit 15, a one-dimensional table storage unit 17 and a matrix mixed table storage unit 22. Each of the plural table transforming means 23 comprises a three-dimensional LUT transforming means 12, a simple LUT transforming means 16 and a matrix mixed transforming means 18.

The three-dimensional LUT transforming means 12 comprises a table search means 13 and a data interpolating means 14. The matrix mixed transforming means 18 comprises a inverse gamma correcting means 19, a matrix calculation means 20 and a gamma correcting means 21.

In the color transforming means 10, the table data from the color transformation table generating means 30 are first stored in the table storage unit 24. A three-dimensional table is stored in the three-dimensional table storage unit 15, a one-dimensional table is stored in the one-dimensional table storage unit 17, and a matrix mixed table is stored in the matrix mixed table storage unit 22. The color transformation system flag is fed to the color transformation switch means 11 to select the corresponding transforming means.

Upon input of the image data, the color transformation is performed by any one of the three-dimensional LUT transforming means 12, the simple LUT transforming means 16 and the matrix mixed transforming means 18 on the basis of the selected color transformation system. The color-transformed image data are fed to and displayed on the display device 6.

The transformation processing in the color transforming means will be described in order to provide a more detailed understanding of the the second embodiment of the present invention discussed above.

First, the three-dimensional LUT transforming means 12 will be described with reference to FIGS. 5A and 5B.

The three-dimensional LUT transforming means 12 performs the color transformation on the basis of the table data shown in the three-dimensional table 60. In the three-dimensional table 60 are stored indexes of reference points 61 which are obtained by dividing the range of input RGB pixel values into N parts (N represents an integer above 2), and pixel values which are obtained by transforming the pixel values of the reference points 61.

When the input RGB data of a point is input, the point is necessarily contained in a rectangular parallelepiped which is surrounded by reference points 61. First, it is checked by the table search means 13 which rectangular parallelepiped contains the input RGB data.

Next, an example of the table search means 13 using the three-dimensional table 60 will be described.

It is assumed that the RGB value of the input image comprises 8-bit data from 0 to 255, and the RGB value of a pixel X on the input image is (20, 200, 120).

An index of the three-dimensional table 60 indicates each one of the reference points from 0 to 5 which are obtained by dividing each of the RGB values into five equal parts. Accordingly, the reference points from 0 to 5 represent (0, 51, 102, 153, 204, 255) respectively. That is, the pixel X is surrounded by the following eight reference points (P1 to P8).
P1: RGB=(0, 153, 102), index=(0, 3, 2)
P2: RGB=(51, 153, 102), index=(1, 3, 2)
P3: RGB=(51, 204, 102), index=(1, 4, 2)
P4: RGB=(0, 204, 102), index=(0, 4, 2)
P5: RGB=(0, 153, 153), index=(0, 3, 3)
P6: RGB=(51, 153, 153), index=(1, 3, 3)
P7: RGB=(51, 204, 153), index=(1, 4, 3)
P8: RGB=(0, 204, 153), index=(0, 4, 3)

The value of each reference point after alteration is referred to (searched) from the three-dimensional table 60. The table search means 13 determines the eight reference points as described above, and performs the process of calculating these transformation values from the three-dimensional table 60.

Subsequently, the value of each reference point after the alteration is interpolated in accordance with the position in the rectangular parallelepiped of the input RGB data to calculate the value of the input RGB data after the alteration.

Next, the data interpolating means 14 in the three-dimensional LUT transforming means 12 will be described with reference to FIG. 7.

The pixel X as described above corresponds to a pixel which is indicated as interpolative target data 70 in FIG. 70. Reference points 71 of P1 to P8 are assumed as reference points which surround the pixel X. It is assumed that the interpolative target data 70 is located between the reference points 71 at the interior divisional position of (a:1-a) for "R", (b:1-b) for "G" and (c:1-c) for "B".

Representing the three-dimensional vector of RGB at each reference point by Pn (n=1, 2, . . . , 8), the RGB vector XX after the interpolation is obtained by the following equation (1) in the case of FIG. 7.

$$XX = (1-a)(1-b)(1-c)P1 +$$
$$a(1-b)(1-c)P2 + ab(1-c)P3 + (1-a)b(1-c)P4 +$$
$$(1-a)(1-b)cP5 + a(1-b)cP6 + abcP7 + (1-a)bcP8$$

The interior divisional ratio can be simply calculated on the basis of data. Further, the interpolating calculation itself can be performed at high speed by a fixed point calculation. The data interpolating means 14 performs the interpolation processing as described above.

The three-dimensional LUT transforming means 12 performs the above transformation processing on the basis of the three-dimensional table data stored in the three-dimensional table storage unit 15.

Next, the simple LUT transforming means 6 shown in FIG. 2 will be described with reference to FIG. 6A and 6B. The simple LUT transforming means 16 performs the transformation processing on the basis of the data shown in the one-dimensional table 50. When the input is the RGB value, a one-dimensional table 50 is allocated to each of R, G and B.

Since the input and the output are stored in a one-to-one correspondence in the one-dimensional table 50 as shown in FIG. 6B, it is sufficient to refer to only the table for the data after being transformed, and thus the color transformation can be performed at very high speed. An example of the one-dimensional table transformation characteristic (the output RGB corresponding to an input RGB value) is shown as a one-dimensional table characteristic 51 in FIG. 6A. The simple LUT transforming means 16 performs the transformation processing on the basis of the reference of the table as described above by using the one-dimensional table data stored in the one-dimensional table storage unit 17.

Next, the matrix mixed transforming means 18 will be described with reference to FIG. 2. The matrix mixed transforming means 18 comprises the inverse gamma correcting means 19, the matrix calculating means 20 and the gamma correcting means 21.

The matrix mixed transforming means 18 performs the color transformation by referring to the matrix mixed data from the matrix mixed table storing unit 22. As shown in the following table 3, the matrix mixed data contain a inverse gamma table, a matrix coefficient of 3×3, and a gamma table.

TABLE 3

|  | COLOR CHARACTERISTIC DATA |
|---|---|
| INVERSE GAMMA TABLE | . . . |
| MATRIX COEFFICIENT | a11, a12, . . . , a33 |
| GAMMA TABLE | . . . |

First, the inverse gamma correcting means 19 performs the one-dimensional table transformation like the simple LUT transforming means 16 on the basis of the inverse gamma table.

Subsequently, a 3×3 matrix calculation is performed by using the 3×3 matrix coefficients in the matrix calculating means 20. Finally, the one-dimensional table transformation is performed by using the gamma table data in the gamma correcting means 21.

Representing the inverse gamma tables of R, G and B by IgammaR[n], IgammaG[n] and IgammaB[n] (n=0, 1, 2, . . . , 255) respectively and the gamma tables of R, G and B by gammaR[n], gammaG[n] and gammaB[n] (n=0, 1, 2, . . . , 255) respectively, and representing matrix M by (a11, a12, . . . , a33), the pixel X=(R1, G1, B1) is transformed to X'=(R2, G2, B2) as described below:

$$Ir = IgammaR[R1]$$

$$Ig = IgammaG[G1]$$

$$Ib = IgammaB[B1] \quad (2)$$

$$\begin{vmatrix} Ir2 \\ Ig2 \\ Ib2 \end{vmatrix} = \begin{vmatrix} a11 & a12 & a13 \\ a21 & a22 & a23 \\ a31 & a32 & a33 \end{vmatrix} \begin{vmatrix} Ir \\ Ig \\ Ib \end{vmatrix} \quad (3)$$

$$R2 = \text{gammaR}[Ir2]$$
$$G2 = \text{gammaG}[Ig2]$$
$$B2 = \text{gammaB}[Ib2] \quad (4)$$

Next, the operation of the color transformation table generating means 30 shown in FIG. 3 will be described.

Referring to FIG. 3, the color transformation table generating means 30 is supplied with the input color characteristic data from the input color characteristic data storage unit 3 shown in FIG. 1, and also supplied with the display color characteristic data from the display color characteristic data storage unit 5. These color characteristic data are mainly constructed by the items shown in the table 1.

The input color characteristic data and the display color characteristic data are input to the color transformation system selecting means 31 to determine which type of transforming means should be used.

In this embodiment, as shown in FIG. 2, the table transforming means 23 contains the three kinds of table transforming means, that is, the three-dimensional LUT transforming means 12, the simple LUT transforming means 16 and the matrix mixed transforming means 18, and any one of these transforming means is selected. The information on the selected transforming means is output as a color transformation system flag to the color transformation switch means 11 in the color transforming means 10.

In this case, when the three-dimensional LUT transforming means 12 is selected, the color transformation system selecting means 31 generates the three-dimensional table in the three-dimensional table generating unit 32, and outputs it to the three-dimensional table storage unit 15 in the color transforming means 10.

Further, when the simple LUT transforming means 16 is selected, the color transformation system selecting means 31 generates the one-dimensional table in the one-dimensional table generating unit 33, and outputs it to the one-dimensional table storing unit 17 in the color transforming means 10.

When the matrix mixed transforming means 18 is selected, the color transformation system selecting means 31 generates the matrix mixed table in the matrix mixed table generating unit 34, and outputs it to the matrix mixed table storage unit 22 in the color transforming means 10.

The three-dimensional LUT transforming means 12 can be more generally used as compared with the other two transforming means (i.e., the simple LUT transforming means 16, the matrix mixed transforming means 18). If the input color characteristic data contain a table for transformation to the intermediate color space and the display color characteristic data contain a table for the transformation from the intermediate color space to the display color space, the three-dimensional table data from the input to the display color space can be generated. By performing the three-dimensional LUT transformation on the basis of this table, the color transformation can be performed irrespective of linearity or non-linearity.

Next, the table generation in the three-dimensional table generating unit 32 of the color transformation table generating means 30 shown in FIG. 3 will be described.

A transformation table from a device color space in the input color characteristic data to an intermediate color space is represented by D1toM, and a transformation table from the intermediate color space in the display color characteristic data to a device color space is represented by MtoD2. Both D1toM and MtoD2 are assumed to have the three-dimensional table data format described above.

In order to determine the RGB value to which the pixel value X of the input image is transformed in the display device color space, X is first subjected to the three-dimensional LUT transformation on the basis of D1toM, and then the transformation result is subjected to the three-dimensional LUT transformation on the basis of MtoD2.

By transforming all the reference points of the three-dimensional table of D1toM as described above, the three-dimensional table D1toD2 from the input device color space to the output device color space can be created. The three-dimensional table generating unit 32 performs the above processing.

The simple LUT transforming means 16 (see FIG. 2) is used when the input and display sides are coincident with each other in color space, but different from each other only in gamma characteristic. In the one-dimensional generating unit 33, one-dimensional table data are generated for each of R,G and B.

Representing the gamma characteristic data of the input color characteristic data by TBLIN and representing the gamma characteristic table of the display color characteristic data by TBLOUT, the input image data may be transformed to linear RGB data by the inverse transformation table of TBLIN, and then subjected to the gamma correction of TBLOUT to be displayed. That is, the one-dimensional table which is generated in the one-dimensional table generating unit 33 has a composite characteristic of the inverse transformation table of TBLIN and the characteristic of transformation table of TBLOUT.

As described above, the one-dimensional table generating unit 33 generates the one-dimensional table having the composite characteristic of the inverse transformation table of the gamma characteristic of the input color characteristic data and the gamma characteristic table of the display color characteristic data.

The matrix mixed transforming means 18 (see FIG. 2) is used when the correction of the color space between the input and display of output sides can be performed by the gamma correction the matrix transformation.

The matrix mixed table generating unit 34 generates data which are generated for each of the inverse gamma correcting means 19, the matrix calculating means 20 and the gamma correcting means 21, mixes these data and then outputs the mixed data as a matrix mixed table.

The table used for the inverse gamma correcting means 19 is obtained as an inverse transformation table of the gamma characteristic table of the input color characteristic data. By passing this one-dimensional table, the gamma characteristic of RGB values of the input image is corrected to return the RGB values to linear RGB values.

The data used in the matrix calculating means 20 are 3×3 matrix data. The matrix data can be calculated on the basis of the xy chromaticity of the RGB fluorescers and the xy chromaticity of reference white color of the input color characteristic data and the display color characteristic data.

First, the 3×3 transformation matrix MA to the CIE-XYZ coordinate system is first calculated on the basis of the input device RGB color space. A calculation method of the matrix coefficients of this matrix is disclosed in the above-described Japanese Laid-open Patent Application No. Hei-4-291591.

Subsequently, the 3×3 transformation matrix MB to the CIE-XYZ coordinate system is calculated on the basis of the display device RGB space. Representing a linear RGB value of the input image by (R1, G1, B1) and representing a displayed RGB value by (R2, G2, B2), the following equations (5) and (6) are satisfied:

$$\begin{vmatrix} X \\ Y \\ Z \end{vmatrix} = MA \begin{vmatrix} R1 \\ G1 \\ B1 \end{vmatrix} \quad (5)$$

$$\begin{vmatrix} X \\ Y \\ Z \end{vmatrix} = MB \begin{vmatrix} R2 \\ G2 \\ B2 \end{vmatrix} \quad (6)$$

Accordingly, (R2, G2, B2) can be calculated from (R1, G1, B1) according to the following matrix transformation of equation (7):

$$\begin{vmatrix} R2 \\ G2 \\ B2 \end{vmatrix} = MB^{-1} \cdot MA \cdot \begin{vmatrix} R1 \\ G1 \\ B1 \end{vmatrix} \quad (7)$$

That is, in the matrix mixed table generating unit 34, $MB^{-1}MA$ is calculated and output as data to be used in the matrix calculating means 20.

The gamma characteristic table in the display color characteristic data is directly used as the one-dimensional table data used in the gamma correcting means 21 for display because it is used to add the gamma characteristic to the linear RGB value.

The matrix mixed table generating unit 34 generates a mixture of the inverse transformation table of the gamma characteristic table of the input color characteristic data, the matrix data of $MB^{-1} \cdot MA$ and the gamma characteristic table in the display color characteristic data, and then outputs the mixture to the color transforming means 10.

As described above, according to the color image display apparatus of the present invention, the color characteristic of the input image is automatically obtained externally, and the color correction which is matched with image data having various characteristics can be performed.

Furthermore, according to the present invention, the transformation system can be suitably changed in accordance with the color characteristics of the input and output sides, and thus when only the gamma characteristic is different between the input and output sides, the transformation processing can be performed at very high speed by using the simple LUT transforming means.

Still furthermore, by using the three-dimensional LUT transformation, the non-linear color transformation which had been impossible using the conventional matrix transformation can be performed, and the color reproduction can be performed with higher precision.

What is claimed is:

1. A color image display method for displaying an image corresponding to an input image signal, comprising the steps of:

(a) obtaining color characteristic data of the input image signal before an input color image is displayed;

(b) selecting a single color transformation method from a plurality of color transformation methods on the basis of color characteristics of a display device and the input color characteristic data to produce a display of the input color image which accurately displays the colors of the input color image, wherein the plurality of color transformation methods include a three-dimensional LUT transforming method, a simple LUT transforming method, and a mixed matrix color transforming method, said mixed matrix color transforming method including an inverse gamma correction step, a color transformation step, and a gamma correction step;

(c) generating a transformation table in accordance with the selected color transformation method; and (d) performing color transformation on the input image signal using the selected color transformation method.

2. The color image display method as claimed in claim 1, wherein the transformation table generated in accordance with the selected color transformation method is one of a three-dimensional table, a one-dimensional table, and a mixed matrix table which is obtained by mixing an inverse gamma correction table, a color transformation matrix and a gamma correction table.

3. A color image display method for displaying an image corresponding to an input image signal, comprising the steps of:

selecting a single color transformation method from a plurality of color transformation methods on the basis of input color characteristic data and color characteristics of a display device to produce a display of an input color image which optimally displays the colors of the input color image, wherein the plurality of color transformation methods include a three-dimensional LUT transforming method, a simple LUT transforming method and a mixed matrix color transforming method, said mixed matrix color transforming method including an inverse gamma correction step, a color transformation step, and a gamma correction step; and performing color transformation on the input image signal using a transformation table which is generated in accordance with the selected color transformation method so as to optimally display the input color image in accordance with the display device.

4. The color image display method as claimed in claim 3, wherein the transformation table generated in accordance with the selected color transformation method is one of a three-dimensional table, a one-dimensional table, and a mixed matrix table which is obtained by mixing an inverse gamma correction table, a color transformation matrix and a gamma correction table.

5. A color image display apparatus for displaying an image corresponding to an input image signal, comprising:

input color characteristic information obtaining means for obtaining input color characteristic data of an input color image signal;

an input color data storage element for holding the input color characteristic data obtained by said input color characteristic information obtaining means;

a display color characteristic data storage element for storing color characteristic data of a display device;

a color transformation table generating element for generating color transformation table data on the basis of the input color characteristic data and the display device color characteristic data; and a color transforming element for correcting the color of the input image data, wherein said color transformation table generating element includes a color transformation system selecting element for selecting a single color transformation system from a plurality of color transformation systems on the basis of the input color characteristic data and the display device color characteristic data to produce a display of an input color image which accurately displays the colors of the input color image, and further includes a plural-tables generating element for generating a plurality of color transformation tables, and wherein the plurality of color transformation systems perform color transformation on the input image signal according to a three-dimensional LUT transforming method, a simple LUT transforming method, and a mixed matrix color transforming method, respectively, said mixed matrix color transforming method including an inverse gamma correction step, a color transformation step, and a gamma correction step.

6. The color image display apparatus as claimed in claim 5, wherein said color transforming element comprises:
- a color transforming switch for indicating a color transformation method selected from the three-dimensional LUT transformation, the simple LUT transformation, and the mixed matrix transformation in accordance with a signal output from said color transformation system selecting element;
- a three-dimensional table storage element for storing a three-dimensional table;
- a three-dimensional LUT transforming element for performing color transformation using the three-dimensional table;
- a one-dimensional table storage element for storing a one-dimensional table;
- a simple LUT transforming element for performing color transformation by using the one-dimensional table;
- a mixed matrix table storage element for storing a mixed matrix table which is obtained by mixing an inverse gamma correction table, a color transformation matrix and a gamma correction table; and
- a mixed matrix color transforming element for performing color transformation by using the mixed matrix table, and wherein said plural-tables generating element of said color transformation table generating means comprises:
- a three-dimensional table generating element for generating the three-dimensional table;
- a one-dimensional table generating element for generating the one-dimensional table; and
- a mixed matrix table generating element for generating the mixed matrix table.

* * * * *

UNITED STATES PATENT AND TRADEMARK OFFICE
CERTIFICATE OF CORRECTION

PATENT NO.   : 5,987,167
DATED        : November 16, 1999
INVENTOR(S)  : Akira Inoue It is certified that error appears in the above-identified patent and that said Letters Patent is hereby corrected as shown below:

On the title page of the above-identified patent, at item [30], change the Foreign Application Priority Data from "6-103848" to --8-103848--.

Signed and Sealed this

Twenty-seventh Day of June, 2000

Attest:

Q. TODD DICKINSON

Attesting Officer

Director of Patents and Trademarks